US009302808B2

(12) United States Patent  (10) Patent No.: US 9,302,808 B2
De Angelis  (45) Date of Patent: Apr. 5, 2016

(54) CASE FOR AN ELECTRONIC DEVICE WITH A COUPLING SYSTEM TO BE COUPLED TO A SEAT

(71) Applicant: Ferrari S.p.A., Modena (IT)

(72) Inventor: Salvatore De Angelis, Maranello (IT)

(73) Assignee: Ferrari S.p.A., Modena (IT)

( * ) Notice: Subject to any disclaimer, the term of this patent is extended or adjusted under 35 U.S.C. 154(b) by 0 days.

(21) Appl. No.: 14/284,081

(22) Filed: May 21, 2014

(65) Prior Publication Data

US 2014/0346167 A1    Nov. 27, 2014

(30) Foreign Application Priority Data

May 22, 2013   (IT) ............................... BO2013A0240

(51) Int. Cl.
| | |
|---|---|
| *B60R 11/02* | (2006.01) |
| *B65D 13/00* | (2006.01) |
| *A45C 11/00* | (2006.01) |
| *B65D 25/54* | (2006.01) |
| *B60R 7/04* | (2006.01) |
| *B60R 11/00* | (2006.01) |

(52) U.S. Cl.
CPC ................ *B65D 13/00* (2013.01); *A45C 11/00* (2013.01); *B65D 25/54* (2013.01); *A45C 2011/003* (2013.01); *A45F 2200/0525* (2013.01); *B60R 7/043* (2013.01); *B60R 11/0252* (2013.01); *B60R 2011/0015* (2013.01); *B60R 2011/0276* (2013.01); *B60R 2011/0294* (2013.01); *Y10S 224/929* (2013.01); *Y10T 29/49895* (2015.01)

(58) Field of Classification Search
CPC ............ B60R 7/043; B60R 2011/0015; B60R 2011/0017; B60R 2011/0012; B60R 2011/0276; B60R 11/0252; B60R 2011/0294; A45C 2011/001; A45C 2011/002; A45C 2011/003; A45F 2200/0508; A45F 2200/0516; A45F 2200/0525; B65D 13/00; B65D 25/54; Y10S 224/929–224/93
USPC ......................................... 224/275, 929–930
See application file for complete search history.

(56) References Cited

U.S. PATENT DOCUMENTS

| | | | | |
|---|---|---|---|---|
| 5,607,054 | A * | 3/1997 | Hollingsworth | ...... G06F 1/1628 206/305 |
| 6,216,927 | B1 * | 4/2001 | Meritt | ........................... 224/275 |
| 7,772,504 | B1 * | 8/2010 | Tashjian | ......................... 174/380 |
| 2002/0003155 | A1 * | 1/2002 | Holland et al. | ............... 224/242 |
| 2004/0016782 | A1 * | 1/2004 | Hsu | ................................ 224/275 |
| 2007/0045365 | A1 * | 3/2007 | Guo et al. | ..................... 224/275 |
| 2009/0073337 | A1 | 3/2009 | Liou et al. | |
| 2012/0308164 | A1 | 12/2012 | Hudson | |

FOREIGN PATENT DOCUMENTS

WO    WO 2013/096633 A1    6/2013

* cited by examiner

*Primary Examiner* — Justin Larson
*Assistant Examiner* — Scott McNurlen
(74) *Attorney, Agent, or Firm* — Blank Rome LLP

(57) ABSTRACT

A case for an electronic device, which is shaped as a book and has: a rear cover, which is provided with a housing pocket to house the electronic device; a front cover, which is hinged to the rear cover; and a locking element, which is hinged to the rear cover and has an upper wall and a lower wall, which are parallel and opposite to one another. The locking element is equipped with a hook-shaped coupler which projects from the lower wall of the locking element. The front cover has a coupling hole, which is arranged at the coupler, when the locking element overlaps the front cover, and is adapted to receive, on the inside, the coupler.

15 Claims, 4 Drawing Sheets

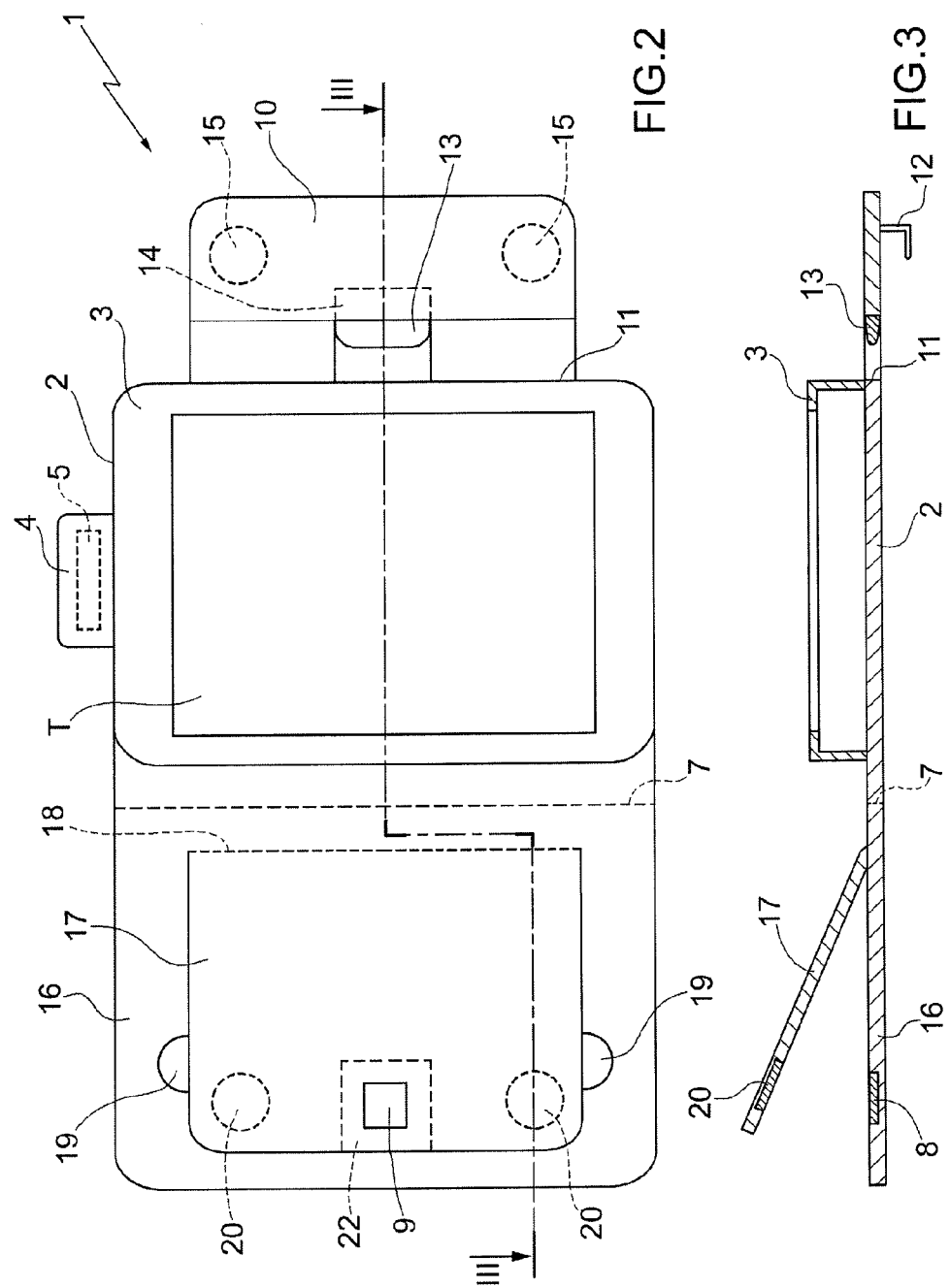

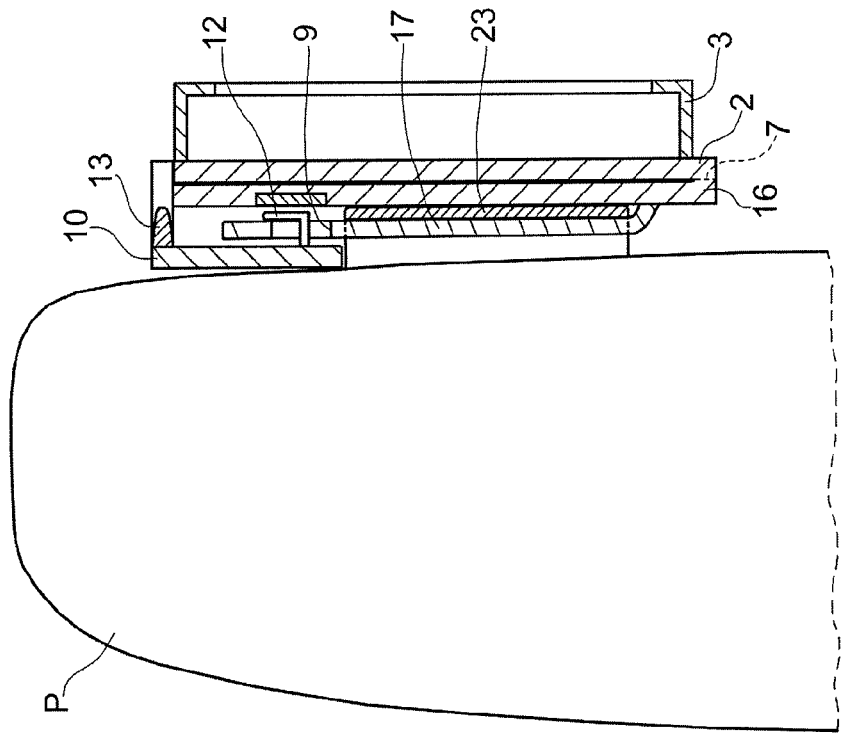
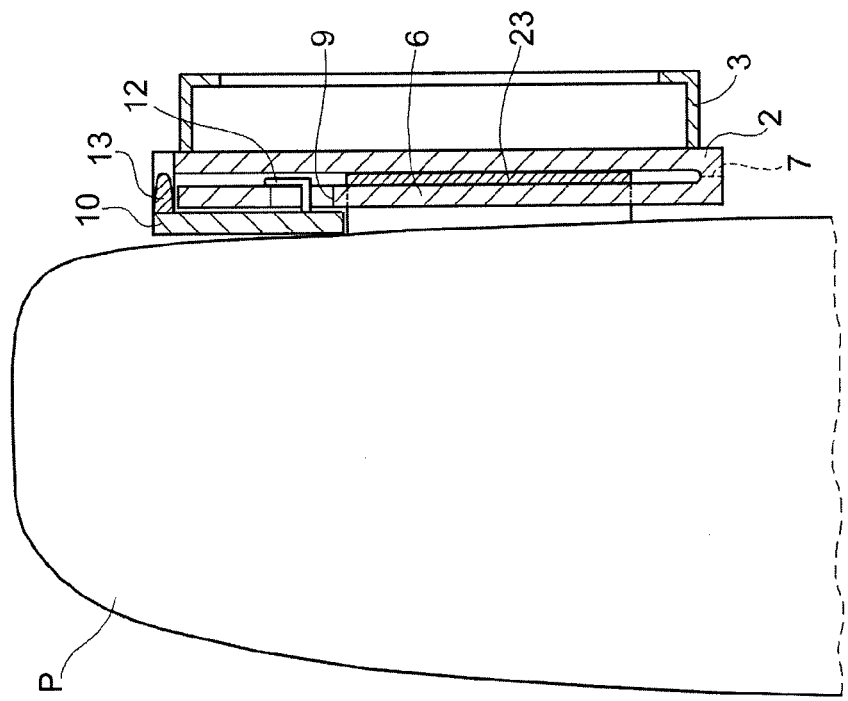

CASE FOR AN ELECTRONIC DEVICE WITH A COUPLING SYSTEM TO BE COUPLED TO A SEAT

BACKGROUND OF THE INVENTION

1. Field of the Invention

The present invention relates to a case for an electronic device with a coupling system to be coupled to a seat.

The present invention is advantageously applied to a case for a computer tablet, to which the following disclosure will explicitly refer without however being less general.

2. Description of the Related Art

Normally, computer tablets are provided with a case having essentially the function of mechanically protecting against blows and scratches. The most common cases for computer tablets are shaped as a book and comprise a rear cover provided with a housing pocket to house the computer tablet and a front cover which is hinged to the rear cover.

Recently, users want to have a case for a computer tablet which can be coupled to the rear wall of a seat of a vehicle to allow the passengers in the rear seats to use the computer tablet without having to hold it in their hands (particularly for watching movies). However, to date, cases for computer tablets which also allow being coupled to the rear wall of a vehicle seat are not known on the market; in this respect it is worth noting that the mechanical coupling of a case containing a computer tablet to the rear wall of a car seat has significant safety problems, because in the event of an accident, it is to be assured that the case does not uncouple from the seat and that the computer tablet does not uncouple from the case, otherwise if the computer tablet (having a mass of 500-700 grams and significant rigidity) uncouples, it may become an extremely dangerous "projectile" for the occupants in the vehicle.

U.S. Patent Application Publication No. US2009073337A1 describes a case for an electronic device, which is shaped as a book and has: a rear cover provided with a housing pocket to house the electronic device, a front cover which is hinged to the rear cover by means of a first hinge, and a locking element which is hinged to the rear cover by means of a second hinge opposite to the first hinge. The locking element is provided with a button-shaped coupler and projects from the lower wall of the locking element; and the front cover has a coupling hole, which is arranged at the coupler, when the locking element overlaps the front cover, and is adapted to receive, on the inside, the coupler. However, the mechanical coupling obtained by the snap coupler has a relatively modest holding force and therefore is absolutely unable to assure that the case will not uncouple from the seat and that the electronic device will not uncouple from the case in the case of an accident. Accordingly, the case described in Patent Application US2009073337A1 is not suitable for being coupled to a vehicle seat.

SUMMARY OF THE INVENTION

It is the object of the present invention to provide a case for an electronic device with a coupling system to be coupled to a seat, which is simple and affordable to implement and does not have the above-described drawbacks, i.e. allows simple coupling/uncoupling to/from a vehicle seat under completely safe conditions.

According to the present invention, a case is provided for an electronic device with a coupling system to be coupled to a seat, as claimed in the appended claims.

BRIEF DESCRIPTION OF THE DRAWINGS

The present invention shall now be described with reference to the accompanying drawings, which illustrate several non-limiting embodiment examples thereof, in which:

FIG. 2 is a diagrammatic and perspective view of a variant of the case in FIG. 1;

FIG. 3 is a diagrammatic and sectional view of the case, according to line III-III in FIG. 2;

FIG. 4 is a diagrammatic and sectional view of the case in FIG. 1, coupled to a headrest of a vehicle seat;

FIG. 5 is a diagrammatic and sectional view of the case in FIG. 2, coupled to a headrest of a vehicle seat;

PREFERRED EMBODIMENTS OF THE INVENTION

Figure 1:
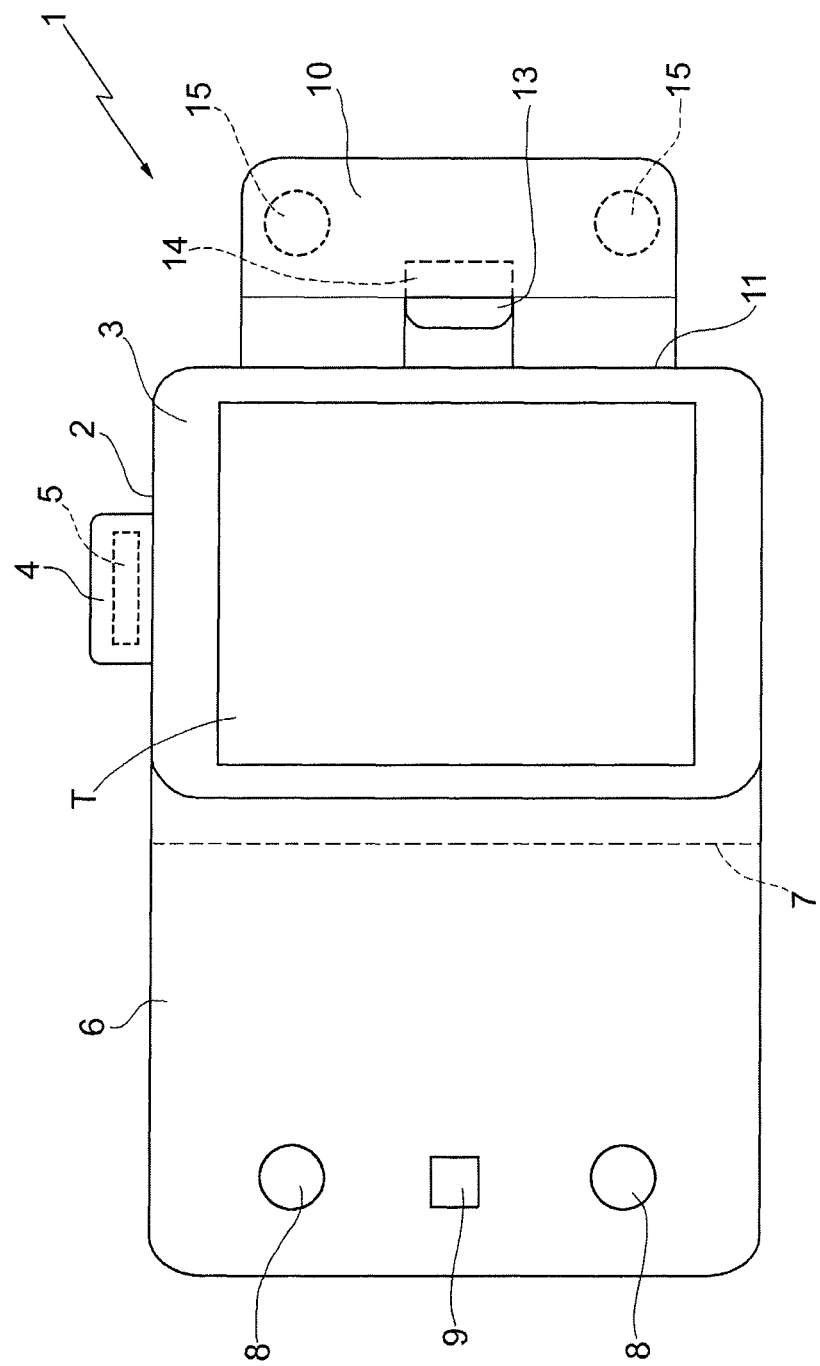
FIG. 1 is a diagrammatic and perspective view of a case for a computer tablet made in accordance with the present invention.

Numeral 1 in FIG. 1 indicates a case 1 as a whole, for a computer tablet T.

Case 1 is shaped as a book and comprises a rear cover 2, which is provided with a housing pocket 3 to house the computer tablet (T); the housing pocket 3 has an access opening through which the computer tablet T may be easily inserted and extracted. The housing pocket 3 also comprises a holding flap 4 which is arranged at the access opening and serves to hold the computer tablet T in the housing pocket 3. The holding flap 4 is provided with a fixing element 5 which mechanically fixes the holding flap 4 to the rear cover 2 so as to prevent undesired movements of the holding flap 4; according to a preferred embodiment, the fixing element 5, comprises a Velcro, but alternatively, the fixing element 5 could comprise a snap button or a magnet.

Case 1, shown in FIG. 1, is also provided with a front cover 6, which is connected to the rear cover 2 by means of a hinge 7 for rotating with respect to the rear cover 2. The front cover 6 is provided with two holding elements 8 which preferably comprise magnets, but may also be replaced by snap buttons or by Velcro. The front cover 6 also has a through coupling hole 9.

According to the first embodiment shown in FIG. 1, case 1 is provided with a locking element 10 which is hinged to the rear cover 2 by means of a hinge 11 which is parallel to hinge 7, to allow a rotation with respect to the rear cover 2. According to the preferred embodiment shown in the accompanying drawings, the locking element 10 is "C"-shaped, i.e. it has a middle through hole which forms the heart of the "C". Connected to a lower surface of the locking element 10 is a coupler 12 (shown in FIG. 4), which is engaged in the coupling hole 9. According to a preferred embodiment, both coupler 12 and the corresponding coupling hole 9 are rectangular in shape.

Coupler 12 is a hook that is hook-shaped (i.e. folded back on itself) and "L"-shaped (as clearly shown in FIG. 3, in which the "L" shape of coupler 12 is apparent). As shown in FIGS. 4 and 5, the coupling hole 9 is a through coupling hole and is adapted to allow, in use, the coupler 12 to pass through the coupling hole 9; in other words, the through coupling hole 9 is (slightly) larger than coupler 12 and therefore coupler 12 passes through the through coupling hole 9. When coupler 12 is inserted into the coupling hole 9 (as shown in FIG. 4), an initial part of coupler 12, which projects upwards (i.e. perpendicular) from the lower surface of the locking element 10, is in the coupling hole 9 (possibly touching an inner surface of the coupling hole 9), while a final part of coupler 12, which is perpendicular to the initial part, is outside the coupling hole 9 and rests on a surface of the front cover 6 opposite to the locking element 10.

The locking element 10 is also provided with a pushing flap 13, which has an inner edge, which is integral with the locking element 10, and an outer edge, which projects from the locking element 10 and is arranged in an empty space delimited by the "C" shape of the locking element 10. Arranged inside the locking element 10 is a reinforcement metal sheet 14, which directly supports coupler 12 and is fixed to the inner edge of the pushing flap 13.

The locking element 10 comprise holding elements 15, preferably magnets (but they may also be replaced by snap buttons or by Velcro), which are coupled to the holding elements 8 of the front cover 6 with a predetermined holding force, when the locking element 10 overlaps the front cover 6.

According to a preferred embodiment, the holding elements 8 of the front cover 6 are positioned, with respect to the elements 15 of the locking element 10, in such a way that the coupling between the holding elements 8 of the front cover 6 and the holding elements 15 of the locking element 10 pushes coupler 12 supported by the locking element 10 towards a position in which it engages the coupling hole 9 more (i.e. in order to disengage coupler 12 from the coupling hole 9, there is a need to overcome the force of magnetic attraction generated between the holding elements 8, 15).

FIG. 2 shows a different embodiment of case 1, which differs in that the front cover 6 is provided with a fixed panel 16 and with a mobile panel 17 which is smaller than the fixed panel 16, is arranged inside the fixed panel 16, and is hinged to the fixed panel 16 by means of a hinge 18 (normally comprising reinforced stitching). In this embodiment, the coupling hole 9 is obtained in a through manner only through the mobile panel 17 of the front cover 6 and therefore is not visible from the outside of the front cover 6. Furthermore, the front cover 6 is provided with two recesses 19 which are not through recesses, are arranged at opposite sides of the mobile panel 17 and are adapted to facilitate the lifting of the mobile panel 17 with respect to the fixed panel 16. The mobile panel 17 is provided with two holding elements 20, preferably magnets (but they may also be replaced by snap buttons or by Velcro). In particular, and as clearly shown in FIG. 3, the fixed panel 16 supports the holding elements 8, while the mobile panel 17 supports the holding elements 20; thereby, the force of magnetic attraction generated between the holding elements 8 and 20 normally keeps the fixed panel 16 in contact with the mobile panel 17. Furthermore, the holding elements 20 of the mobile panel 17 interact with the holding elements 15 of the locking element 10 when the locking element 10 overlaps the front cover 6.

As shown in FIG. 5, when coupler 12 is inserted into the coupling hole 9, the initial part of coupler 12, which projects upwards (i.e. perpendicular) from the lower surface of the locking element 10, is in the coupling hole 9 (possibly touching an inner surface of the coupling hole 9), while the final part of coupler 12, which is perpendicular to the initial part, is outside the coupling hole 9 and rests on a surface of the mobile panel 17 of the front cover 6 opposite to the locking element 10.

According to a preferred embodiment, the holding elements 20 of the mobile panel 17 of the front cover 6 are positioned, with respect to the elements 15 of the locking element 10, in such a way that the coupling between the holding elements 20 of the mobile panel 17 of the front cover 6 and the holding elements 15 of the locking element 10 pushes coupler 12 supported by the locking element 10 towards a position in which it engages the coupling hole 9 more (i.e. in order to disengage coupler 12 from the coupling hole 9, there is a need to overcome the force of magnetic attraction generated between the holding elements 20 and 15).

According to a preferred embodiment, the mobile panel 17 comprises, on the inside, a sheet of pressed cardboard (commercially known as "regenerated leather") and, in the area close to the coupling hole 9, is stiffened by a reinforcement metal sheet 22 (the same type of reinforcement metal sheet is normally arranged around the coupling hole 9 also in the embodiment shown in FIG. 1).

With reference to what is shown in FIG. 4, below is a description of the method for coupling case 1 shown in FIG. 1, to a rear wall of a vehicle seat and in particular, to a rear wall of a headrest P of the seat which is provided with a holding ring 23 (better shown in FIG. 6).

Case 1 is connected to headrest P by means of inserting the front cover 6 into the holding ring 23, from the bottom; alternatively, the front cover 6 could be inserted into the holding ring 23 from the top. Then, the rear cover 2 is rotated by 180° around hinge 7 and with respect to the front cover 6, so as to lay the rear cover 2 against the front cover 6 (leaving the housing pocket 3 visible) and hence pinch the holding ring 23 of headrest P between the two covers 2 and 6. At this point, the locking element 10 is rotated by 180° around hinge 11 and with respect to the rear cover 2, so as to bring coupler 12 to the coupling hole 9 obtained in the front cover 6. Finally, coupler 12 is inserted into the coupling hole 9 to establish a stable mechanical connection between the two covers 2 and 6. In this position, the holding elements 15 of the locking element 10 couple magnetically to the holding elements 8 of the front cover 6 to hold coupler 12 in the coupling hole 9 with greater force.

With reference to what is shown in FIG. 5, below is a description of the method for coupling case 1 shown in FIG. 2, to a rear wall of a vehicle seat and in particular, to a rear wall of a headrest P of the seat which is provided with a holding ring 23 (better shown in FIG. 6).

Case 1 is connected to headrest P by means of inserting the front cover 6 into the holding ring 23, from the bottom of the mobile panel 17 (alternatively, the mobile panel 17 of the front cover 6 could be inserted into the holding ring 23 from the top); thereby, the holding ring 23 is interposed between the mobile panel 17 and the fixed panel 16 of the front cover 6 and therefore the holding ring 23 is pinched between the mobile panel 17 and the fixed panel 16 of the front cover 6. Then, the rear cover 2 is rotated by 180° around-hinge 7 and with respect to the front cover 6, so as to lay the rear cover 2 against the front cover 6 (leaving the housing pocket 3 visible). At this point, the locking element 10 is rotated by 180° around hinge 11 and with respect to the rear cover 2, so as to bring coupler 12 to the coupling hole 9 obtained in the mobile panel 17 of the front cover 6. Finally, coupler 12 is inserted into the coupling hole 9 to establish a stable mechanical connection between the two covers 2 and 6. In this position, the holding elements 15 of the locking element 10 couple magnetically to the holding elements 20 of the mobile panel 17 of the front cover 6 to hold coupler 12 in the coupling hole 9 with greater force.

Figure 6:
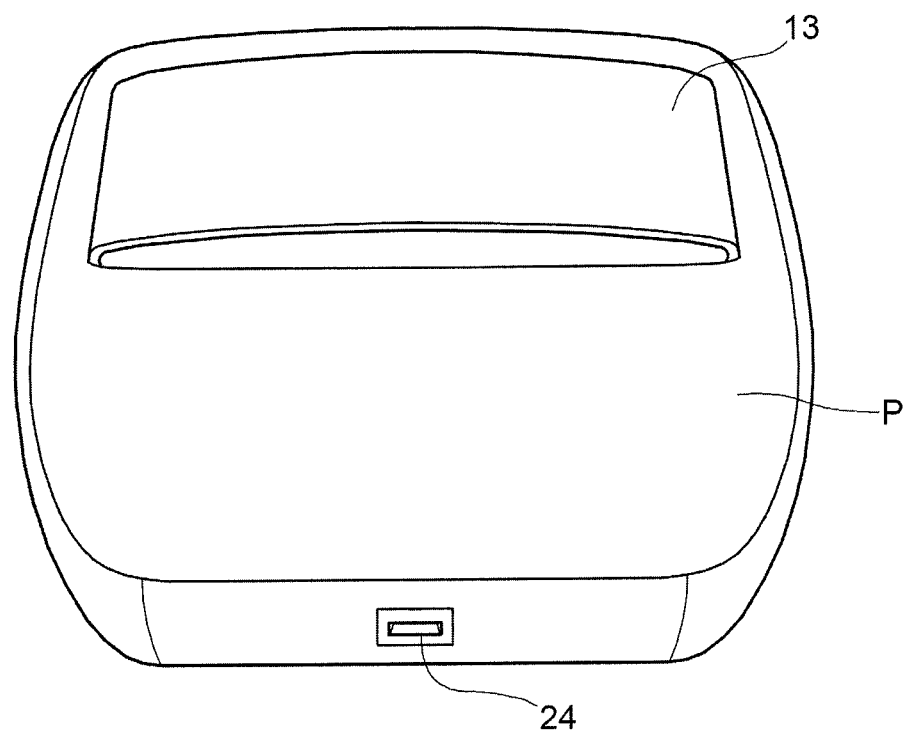
FIG. 6 is a diagrammatic view of the headrest in FIGS. 4 and 5, without case.

FIG. 6 shows headrest P of the seat of a car, without case 1. According to a preferred embodiment, headrest P is provided with a "USB" port 24 for recharging the battery of the computer tablet T (and possibly for a data connection between the computer tablet T and the infotelematic system of the car); preferably the "USB" port 24 is arranged below the holding ring 23 in a position which is relatively hidden from sight.

Figure 7:
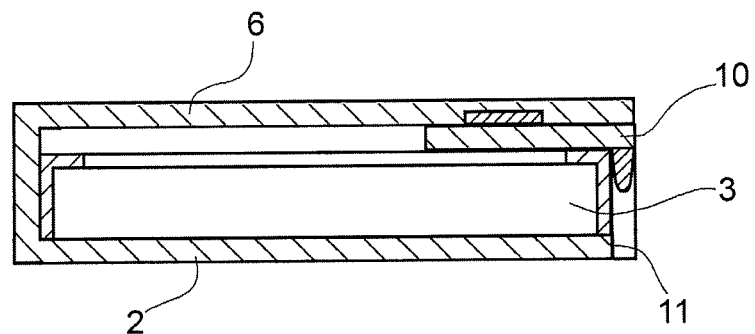
FIG. 7 is a diagrammatic and sectional view of the case in FIG. 1 or in FIG. 2, uncoupled from the headrest in FIG. 6.

As shown in FIG. 7, when case 1 is uncoupled from headrest P, case 1 becomes a common case which surrounds and protects the computer tablet T and has the shape and sizes of a standard case. In particular, when case 1 is uncoupled from headrest P, the locking element 10 is rotated by 180° around hinge 11 to be positioned above the housing pocket 3 and therefore the front cover 6 is rotated by 180° around hinge 7 and with respect to the rear cover 2, so as to be positioned above the locking element 10 (in this position, the front cover 6 covers and protects the computer tablet T). Finally, coupler 12 is inserted into the coupling hole 9 to establish a stable mechanical connection between the two covers 2 and 6. In this position, the holding elements 15 of the locking element 10 couple magnetically to the holding elements 20 of the mobile panel 17 of the front cover 6 (or, alternatively, to the holding elements 8 of the front cover 6) to hold coupler 12 in the coupling hole 9.

In the embodiment shown in the accompanying drawings, case 1 couples to headrest P of the seat by means of the holding ring 23; obviously, the holding ring 23 could be arranged in a different position of the rear wall of the seat (e.g. in the seat arranged below headrest P).

The above-described case 1 has various advantages.

Firstly, case 1 described above allows an extremely stable, sturdy and reliable mechanical coupling to be achieved with headrest P, and therefore ensures that the computer tablet T does not uncouple in undesired and damaging manner from headrest P in the case of impact. In other words, case 1 described above easily overcomes all impact tests to which a vehicle is subjected to obtain road type approval, because under all conditions of impact, it allows the undesired uncoupling from headrest P to be avoided with extreme safety. In particular, case 1 described above allows an integral mechanical connection with headrest P (which is very important in terms of safety), but at the same time, when desired, case 1 may be removed from headrest P to be used as a common, easily transportable case.

Furthermore, case 1 described above is for all intents and purposes similar to a standard case and therefore it may be easily used, also when uncoupled from headrest P; in other words, case 1 described above does not differ significantly (i.e. in shape and sizes) from a standard case and therefore it may be easily used, also when uncoupled from headrest P.

What is claimed is:

1. A case for a computer tablet, which is shaped as a book and comprises:
   a rear cover, which is provided with a housing pocket to house the computer tablet;
   a front cover, which is hinged to the rear cover by means of a first hinge; and
   a locking element, which is hinged to the rear cover by means of a second hinge opposite to the first hinge, has an upper wall and a lower wall, which are parallel and opposite to one another, and is equipped with a coupler which projects from the lower wall of the locking element; and
   wherein the locking element can be rotated around the second hinge to be positioned alternatively parallel to the rear cover and above a lower wall of the rear cover opposite to the housing pocket, or parallel to the rear cover and on the housing pocket;
   wherein the front cover has a through coupling hole, which is arranged in correspondence to the coupler, when the locking element overlaps the front cover, and is suited to receive, on the inside, the coupler;
   wherein the coupler is a hook that is hook-shaped and "L"-shaped;
   wherein the coupling hole is suited to allow, in use, the hook-shaped and "L"-shaped coupler to pass through the coupling hole;
   wherein the front cover comprises a fixed panel and a mobile panel, which is hinged to the fixed panel by means of a third hinge and has the coupling hole.

2. A case according to claim 1, wherein the fixed panel and the mobile panel comprise respective holding elements, which are coupled to one another with a predetermined holding force, so as to hold the two panels in contact with one another.

3. A case according to claim 2, wherein the holding elements are comprised of magnets.

4. A case according to claim 1, wherein the fixed panel of the front cover is provided with two recesses, which are arranged on opposite sides of the mobile panel.

5. A case according to claim 1, wherein the housing pocket is provided with a holding flap.

6. A case for a computer tablet, which is shaped like a book and comprises:
   a rear cover, which is provided with a housing pocket to house the computer tablet;
   a front cover, which is hinged to the rear cover by means of a first hinge; and
   a locking element, which is hinged to the rear cover by means of a second hinge opposite to the first hinge, has an upper wall and a lower wall, which are parallel and opposite to one another, and is equipped with a coupler which projects from the lower wall of the locking element; and
   wherein the locking element can be rotated around the second hinge to be positioned alternatively parallel to the rear cover and above a lower wall of the rear cover opposite to the housing pocket, or parallel to the rear cover and on the housing pocket;
   wherein the front cover has a through coupling hole, which is arranged in correspondence to the coupler, when the locking element overlaps the front cover, and is suited to receive, on the inside, the coupler;
   wherein the coupler is a hook that is hook-shaped and "L"-shaped;
   wherein the coupling hole is suited to allow, in use, the hook-shaped and "L"-shaped coupler to pass through the coupling hole; and
   wherein the locking element is "C"-shaped and is provided with a pushing flap, which has an inner edge, which is integral to the locking element, and an outer edge, which projects from the locking element and is arranged in an empty space delimited by the "C" shape of the locking element.

7. A case according to claim 6, wherein the locking element comprises, on an inside, a reinforcement metal sheet, which directly supports the coupler and is fixed to the inner edge of the pushing flap.

8. A case according to claim 1, wherein the front cover and the locking element comprise respective holding elements, which are coupled to one another with a predetermined holding force, when the locking element overlaps the front cover.

9. A case according to claim 8, wherein the holding elements are comprised of magnets.

10. A case according to claim 9, wherein the magnets of the front cover are positioned, with respect to the magnets of the locking element, in such a way that the magnetic coupling between the magnets of the front cover and the magnets of the locking element pushes the coupler supported by the locking element towards a position in which it engages more the coupling hole.

11. A case according to claim 1, wherein the front cover is provided with a reinforcement metal sheet, which is arranged around the coupling hole.

12. A case according to claim 1, wherein, when the coupler is inserted in the coupling hole, an initial part of the coupler, which projects upwards from the locking element, is in the coupling hole and a final part of the coupler, which is perpendicular to the initial part, is outside the coupling hole and rests on a surface of the front cover opposite to the locking element.

13. A method to couple a rear wall of a seat provided with a holding ring to a case for a computer tablet which is shaped like a book and comprises:
- a rear cover, which is provided with a housing pocket to house the computer tablet;
- a front cover, which is hinged to the rear cover by means of a first hinge; and
- a locking element, which is hinged to the rear cover by means of a second hinge opposite to the first hinge, has an upper wall and a lower wall, which are parallel and opposite to one another, and is equipped with a coupler which projects from the lower wall of the locking element; and
- wherein the locking element can be rotated around the second hinge to be positioned alternatively parallel to the rear cover and above a lower wall of the rear cover opposite to the housing pocket, or parallel to the rear cover and on the housing pocket;
- wherein the front cover has a through coupling hole, which is arranged in correspondence to the coupler, when the locking element overlaps the front cover, and is suited to receive, on the inside, the coupler;
- wherein the coupler is a hook that is hook-shaped and "L"-shaped; and
- wherein the coupling hole is suited to allow, in use, the hook-shaped and "L"-shaped coupler to pass through the coupling hole;

the method comprising the steps of:
inserting the front cover into the holding ring of the seat;
rotating the rear cover around the first hinge, so as to lay the rear cover against the front cover;
rotating the locking element around the second hinge, so as to bring the coupler in correspondence to the coupling hole; and
inserting the coupler into the coupling hole, so as to cause the coupler to pass through the coupling hole and therefore to establish a stable mechanical connection between the two covers.

14. A method according to claim 13, wherein:
the front cover comprises a fixed panel and a mobile panel, which is hinged to the fixed panel by means of a third hinge and has the coupling hole; and
the step of inserting the front cover into the holding ring comprises inserting, into the holding ring, only the mobile panel of the front cover, so as to interpose the holding ring between the mobile panel and the fixed panel of the front cover.

15. A case according to claim 1, wherein:
when the case is coupled to a rear wall of a seat provided with a holding ring, the front cover is parallel to the rear cover and is positioned on a lower wall of the rear cover opposite to the housing pocket and the locking element is parallel to the rear cover and is positioned on the front cover and above the rear cover; and
when the case is uncoupled from the rear wall of the seat, the locking element is parallel to the rear cover and is positioned on the housing pocket and the front cover is parallel to the rear cover and is positioned on the locking element and above the housing pocket.

* * * * *